US006603118B2

(12) United States Patent
Ellson et al.

(10) Patent No.: US 6,603,118 B2
(45) Date of Patent: Aug. 5, 2003

(54) ACOUSTIC SAMPLE INTRODUCTION FOR MASS SPECTROMETRIC ANALYSIS

(75) Inventors: Richard N. Ellson, Palo Alto, CA (US); Mitchell W. Mutz, Palo Alto, CA (US)

(73) Assignee: Picoliter Inc., Sunnyvale, CA (US)

( * ) Notice: Subject to any disclaimer, the term of this patent is extended or adjusted under 35 U.S.C. 154(b) by 237 days.

(21) Appl. No.: 09/784,705

(22) Filed: Feb. 14, 2001

(65) Prior Publication Data

US 2002/0109084 A1 Aug. 15, 2002

(51) Int. Cl.[7] .......................... H01J 49/04; G01N 1/10; G01N 35/10

(52) U.S. Cl. ...................... 250/288; 436/180; 422/100; 422/63; 435/30; 73/864; 73/864.81

(58) Field of Search ......................... 250/288; 436/180; 422/100, 63; 435/30; 73/864

(56) References Cited

U.S. PATENT DOCUMENTS

| | | | | |
|---|---|---|---|---|
| 4,308,547 A | | 12/1981 | Lovelady et al. | 346/140 |
| 4,751,529 A | | 6/1988 | Elrod et al. | 346/140 |
| 5,306,412 A | | 4/1994 | Whitehouse et al. | 204/299 R |
| 5,520,715 A | | 5/1996 | Oeftering | 75/335 |
| 5,722,479 A | | 3/1998 | Oeftering | 164/46 |
| 5,808,636 A | | 9/1998 | Stearns | 347/46 |
| 5,877,580 A | | 3/1999 | Swierkowski | 310/328 |
| 2002/0094582 A1 | * | 7/2002 | Williams et al. | 436/180 |

FOREIGN PATENT DOCUMENTS

| | | | |
|---|---|---|---|
| DE | 27 31 225 A1 | * | 1/1979 |
| EP | 0434931 A2 | | 7/1991 |

OTHER PUBLICATIONS

U.S. patent application Ser. No. 09/669,267, Ellson, filed Sep. 25, 2000.
U.S. patent application Ser. No. 09/669,996, Ellson et al., filled Sep. 25, 2000.
U.S. patent application Ser. No. 09/669,997, Mutz et al., filled Sep. 25, 2000.

* cited by examiner

*Primary Examiner*—Jack Berman
(74) *Attorney, Agent, or Firm*—Reed & Eberle LLP; Dianne E. Reed; Louis L. Wu

(57) ABSTRACT

The invention relates to the efficient transport of a small fluid sample such as that may be required by analytical devices such as mass spectrometers configured to analyze small samples of biomolecular fluids. Such transport involves nozzleless acoustic ejection, wherein analyte molecules are introduced from a reservoir holding a fluid into an ionization chamber of an analytical device or a small capillary by directing focused acoustic radiation at a focal point near the surface of the fluid sample. This facilitates the analysis of various types of analytes such as biomolecular analytes having a high molecular weight.

70 Claims, 4 Drawing Sheets

ACOUSTIC SAMPLE INTRODUCTION FOR MASS SPECTROMETRIC ANALYSIS

TECHNICAL FIELD

This invention relates generally to devices and methods for introducing a small quantity of a fluid sample into a sample vessel such as an ionization chamber or a capillary tube. More particularly, the invention relates to nozzleless acoustic ejection to form and deliver ionized droplets for mass spectrometry.

BACKGROUND

In the field of genomics and proteomics, there is a need for analytical techniques that allow for compositional analysis of minute quantities of sample materials. Mass spectrometry is a well-established analytical technique for such analysis. Mass spectrometry operates through ionization of analyte molecules and sorting the molecules by mass-to-charge ratio. For analyte molecules contained in a fluid sample, the sample fluid is typically converted into an aerosol that undergoes desolvation, vaporization, atomization, excitation and ionization in order to form analyte ions.

For fluid samples, sample introduction is a critical factor that determines the performance of analytical instrumentation such as mass spectrometers or electrophoretic devices. Analyzing the elemental constituents of a fluid sample generally requires the sample to be dispersed into a spray of small droplets or loaded in a predetermined quantity. Often, a combination of a nebulizer and a spray chamber is used in sample introduction, wherein the nebulizer produces the spray of droplets, and the droplets are then forced through a spray chamber and sorted. Such droplets may be produced through a number of methods such as those that employ ultrasonic energy and/or use a nebulizing gas. However, such nebulizers provide little control over the distribution of droplet size and no meaningful control over the trajectory of the droplets. As a result, the yield of droplets having an appropriate size and trajectory is low. In addition, the analyte molecule may be adsorbed in the nebulizer, and large droplets may condense on the walls of the spray chamber. As a result, the combination suffers from low analyte transport efficiency and high sample consumption.

Mass spectrometry has also been employed for samples that have been prepared as an array of features on a substrate. Matrix-Assisted Laser Desorption Ionization (MALDI) for example, is an ionization techniques for large and/or labile biomolecules such as nucleotidic and peptidic oligomers, polymers and dendrimers as well as non-biomolecular compounds such as fullerenes. In MALDI, a small volume of sample fluid is deposited on a photon-absorbing substrate and allowed to dry. Once solvent has been evaporated from the substrate, a laser strikes the target, and then ions and neutrals are desorbed. The substrate greatly increases the desorption performance and is considered a "soft" ionizing technique in which both positive and negative ions are produced. Surface Enhanced Laser Desoprtion Ionization (SELDI) is another surface-based ionization technique that allows for high-throughput mass spectrometry. It should be evident, then, that sample preparation for such a device requires accurate and precise placement of carefully metered amounts of sample fluids on a substrate surface in order to reduce sample waste. Often, sample deposition on to a substrate involves the use of small Eppendorf-type capillaries.

Currently, microfluidic devices have been used as chemical analysis tools as well as a means for introducing sample into clinical diagnostic tools. Their small channel size allows for the analysis of minute quantities of sample, which is an advantage where the sample is expensive or difficult to obtain. In particular, certain biomolecular samples, e.g., nucleotidic and peptide analyte molecules, are exceptionally expensive. However, microfluidic devices suffer from a number of unavoidable design limitations and drawbacks with respect to sample handling. For example, the flow characteristics of fluids in the small flow channels of a microfluidic device often differ from the flow characteristics of fluids in larger devices, as surface effects come to predominate and regions of bulk flow become proportionately smaller. Thus, in order to control sample flow, the surfaces of such devices must be adapted according to the particular sample to provide motive force to drive the sample through the devices. This means that a certain amount of sample waste must occur due to wetting of the device surfaces.

Surface wetting is a source of sample waste in other fluid delivery systems as well. For example, capillaries having a small interior channel for fluid transport are often employed in sample fluid handling by submerging their tips into a pool of sample. In order to provide sufficient mechanical strength for handling, such capillaries must have a large wall thickness as compared to the interior channel diameter. Since any wetting of the exterior capillary surface results in sample waste, the high wall thickness/channel diameter ratio exacerbates sample waste. In addition, the sample pool has a minimum required volume driven not by the sample introduced into the capillary but rather by the need to immerse the large exterior dimension of the capillary. As a result, the sample volume required for capillary submersion may be more than an order of magnitude larger than the sample volume transferred into the capillary. Moreover, if more than one sample is introduced into a capillary, the previously immersed portions of the capillary surface must be washed between sample transfers in order to eliminate cross contamination. Cross contamination in the context of mass spectrometry results in a memory effect wherein spurious signals from a previous sample compromises data interpretation. In order to eliminate the memory effect, then, increased processing time is required to accommodate the washings between sample introductions.

Accordingly, it is desired to provide a device that requires only small volumes of sample to effect efficient sample delivery into analytical devices such as mass spectrometers or capillaries, that does not lead to compromised analysis due to the above-described memory effect, and that does not require long washing times.

A number of patents have proposed different techniques for sample ionization and delivery. For example, U.S. Pat. No. 5,306,412 to Whitehouse et al. describes an apparatus that applies mechanical vibrations to an outlet port of an electrospray tip to enhance electrostatic dispersion of sample solutions into small, highly charged droplets resulting in the production of ions of solute species for mass spectrometric analysis. The technology disclosed in this patent purports to overcome the problems associated with use of inkjet technology for sample ionization and delivery. The patent discloses that due to plugging problems with nozzle orifices smaller than about 10 $\mu$m, the techniques used in inkjet printing are not practical for the production of droplets in the size range required for efficient ion production in the mass spectrometric analysis of solutions. In addition, it is also disclosed that a single small orifice diameter associated with inkjet printers would not be effective over the flow rates associated with sample introduction in electrospray mass spectrometry. Like other electrospray systems, the described apparatus is disclosed to produce droplets of appropriate size but lacks control over the droplet trajectory as they depart from the electrospray tip.

A number of patents have described the use of acoustic energy in printing. For example, U.S. Pat. No. 4,308,547 to Lovelady et al. describes a liquid drop emitter that utilizes acoustic principles in ejecting liquid from a body of liquid onto a moving document for forming characters or bar codes thereon. Lovelady et al. is directed to a nozzleless inkjet printing apparatus wherein controlled drops of ink are propelled by an acoustical force produced by a curved transducer at or below the surface of the ink. In contrast to inkjet printing devices, nozzleless fluid ejection devices as described in the aforementioned patent are not subject to clogging and the disadvantages associated therewith, e.g., misdirected fluid or improperly sized droplets. In other words, nozzleless fluid delivery provides for high fluid-delivery efficiency through accurate and precise droplet placement. Nozzleless fluid ejection also provides for a high level of control over ejected droplet size.

While the nozzleless fluid ejection has generally been limited to ink printing applications, it is not completely unknown in the field of ionized fluid delivery. U.S. Pat. Nos. 5,520,715 and 5,722,479, each to Oeftering describes an apparatus for manufacturing a free standing solid metal part through acoustic ejection of charged molten metal droplets. The apparatus employs electric fields to direct the charged droplets to predetermined points on a target where the droplets are solidified as a result of cooling. It should be readily evident that the apparatus disclosed in these patents employs acoustic ejection for metallic part synthesis rather than for biomolecular analysis. In addition, a high temperature is required in order to melt most metal samples and that such an apparatus would be incompatible with samples that decompose or are otherwise adversely affected by exposure to such high temperatures.

Thus, there is a need in the art for improved sample introduction devices and methods employing acoustic ejection to deliver a small quantity of a fluid sample into a sample vessel such as an ionization chamber with accuracy, precision and efficiency.

SUMMARY OF THE INVENTION

Accordingly, it is an object of the present invention to provide devices and methods that overcome the above-mentioned disadvantages of the prior art. One embodiment of the invention relates to an analytical device having an ionization chamber for analyzing an analyte molecule. The analytical device also includes an acoustic ejector for introducing the analyte molecule from a reservoir holding a fluid sample comprised of analyte molecule. The ejector comprises an acoustic radiation generator for generating acoustic radiation and a focusing means for focusing the acoustic radiation at a focal point near the surface of the fluid sample. Furthermore, a means for positioning the ejector in acoustic coupling relationship to the reservoir is provided. The analytical device, for example, may be a time-of-flight mass spectrometer and allows for analysis various types of analyte molecules such as biomolecules having a high molecular weight.

Typically, the inventive devices allow for droplet ejection from a small volume of fluid. For instance, the fluid sample may occupy a volume in the picoliter range, and the ejected droplets may occupy a volume in the femtoliter range. Moreover, acoustic ejection results in precise and accurate control over droplet trajectory.

Another embodiment of the invention relates to a method for introducing an analyte molecule into an ionization chamber of an analytical device. The inventive method provides for a reservoir holding a fluid sample comprised of the analyte molecule and employs focused acoustic radiation directed at a point near the surface of the fluid sample to eject a droplet of the fluid sample therefrom along a predetermined trajectory into the ionization chamber. The method allows for accuracy and precision in the formation and placement of ejected droplets such that the ejected droplets may be substantially identical in size and follow substantially identical trajectories.

Still another embodiment of the invention relates to an analytical device having an ionization chamber for analyzing a plurality of analyte molecules. The device includes a plurality of reservoirs each holding a fluid sample comprised of an analyte molecule, an ejector comprising an acoustic radiation generator for generating acoustic radiation and a focusing means for focusing the acoustic radiation at a focal point near the surface of the fluid sample, and a means for positioning the ejector in acoustic coupling relationship to each of the reservoirs to eject a droplet of fluid sample into the ionization chamber. In some cases, the reservoirs are arranged in an array such as in the case where the reservoirs comprise designated sites on a single flat substrate surface. Preferably, a means for altering the spatial relationship of at least one reservoir with respect to the ionization chamber is also provided.

In a further embodiment, the invention relates to a method for introducing fluid samples into an ionization chamber. The method involves: (a) providing a plurality of reservoirs each holding a fluid sample having a fluid surface; (b) positioning an ejector in acoustically coupled relationship to a selected reservoir; (c) activating the ejector to generate acoustic radiation having a focal point near the fluid surface of the fluid sample contained in the selected reservoir to eject a droplet of fluid sample into the ionization chamber; and (d) optionally repeating steps (b) and (c) for an additional reservoir. Typically, the method allows for locating the fluid surface of the fluid sample held by the selected reservoir before ejecting one or more droplets from the reservoir. The surface of the fluid samples may be located by detecting for reflected acoustic radiation from the fluid sample. Optionally, acoustic reflections may be used to align the acoustic focus with the opening of the ionization chamber or capillary.

Thus, the invention also provides a method for preparing a plurality of analyte molecules for analysis. Such preparation involves applying focused acoustic energy to each of a plurality of fluid-containing reservoirs, each of said reservoirs containing an analyte molecule in a fluid to be applied to a designated site on the substrate surface in order to prepare an array comprised of a plurality of analyte molecules on a substrate surface. Once the array is prepared, sufficient energy is successively applied to each site to ionize the analyte molecules and release the analyte molecules from the substrate surface for analysis. The energy may be applied, e.g., by bombarding the sites with acoustics, photons, electrons and/or ions.

In another embodiment, the invention relates to a device for efficient transport of fluid sample. The device comprises a sample vessel having an inlet opening with a limiting dimension of no more than about 300 $\mu$m, a reservoir holding a fluid sample having a volume of no more than about 5 $\mu$l, and an ejector configured to eject at least about 25% of the fluid sample through the inlet opening into the sample vessel. Typically, the ejector comprises an acoustic radiation generator for generating radiation, a focusing means for directing the radiation at a focal point near the surface of the fluid sample, and a means for positioning the ejector in coupling relationship to the reservoir. Optionally, the ejector does not directly contact the radiation generator. The efficiency of this device lies in the ability of the device to handle extremely small sized fluid samples with little or no sample waste. Similarly, another embodiment of the invention relates to a method for efficient transport of a droplet of a fluid sample, wherein a reservoir is provided containing a fluid sample having a volume of no more than about 5 μl, and at least 25% of the fluid sample is ejected through an inlet opening of a sample vessel, the inlet opening having a limiting dimension of no more than about 300 μm.

In a still further embodiment, a device for efficient transport of fluid sample is provided. The device comprises: a sample vessel having an inlet opening with a limiting dimension of no more than about 10 μm to about 300 μm; a reservoir holding a fluid sample having a depth of about 0.1 to about 30 times the limiting dimension of the inlet opening; and an ejector configured to eject a droplet of the fluid sample through the inlet opening into the sample vessel. The sample vessel of the device does not contact the fluid sample held by the reservoir.

In yet another embodiment, a device for efficient transport of fluid sample is provided comprising: a sample vessel having an inlet opening with a limiting dimension; a reservoir holding a fluid sample having a depth of about 0.1 to about 30 times the limiting dimension of the inlet opening; and an acoustic ejector. The acoustic ejector is configured to eject a droplet of the fluid sample through the inlet opening into the sample vessel and comprises an acoustic radiation generator for generating acoustic radiation having a predetermined wavelength in the fluid sample selected according to the limiting dimension of the inlet opening of the sample vessel or the depth of the fluid sample and a focusing means for focusing the acoustic radiation at a focal point near the surface of the fluid sample, wherein the acoustic ejector is in acoustic coupling relationship to the reservoir.

BRIEF DESCRIPTION OF THE DRAWINGS

The invention is described in detail below with reference to the following drawings, wherein like reference numerals indicate corresponding structure throughout the several views.

FIG. 2A illustrates acoustic coupling of an acoustic ejector with a fluid sample on a first designated site on a substrate.

FIG. 2B illustrates the same device wherein the substrate is moved such that the ejector is acoustically coupled to another fluid sample on a second designated site on the substrate.

DETAILED DESCRIPTION OF THE INVENTION

Definitions and Overview

Figure 1:
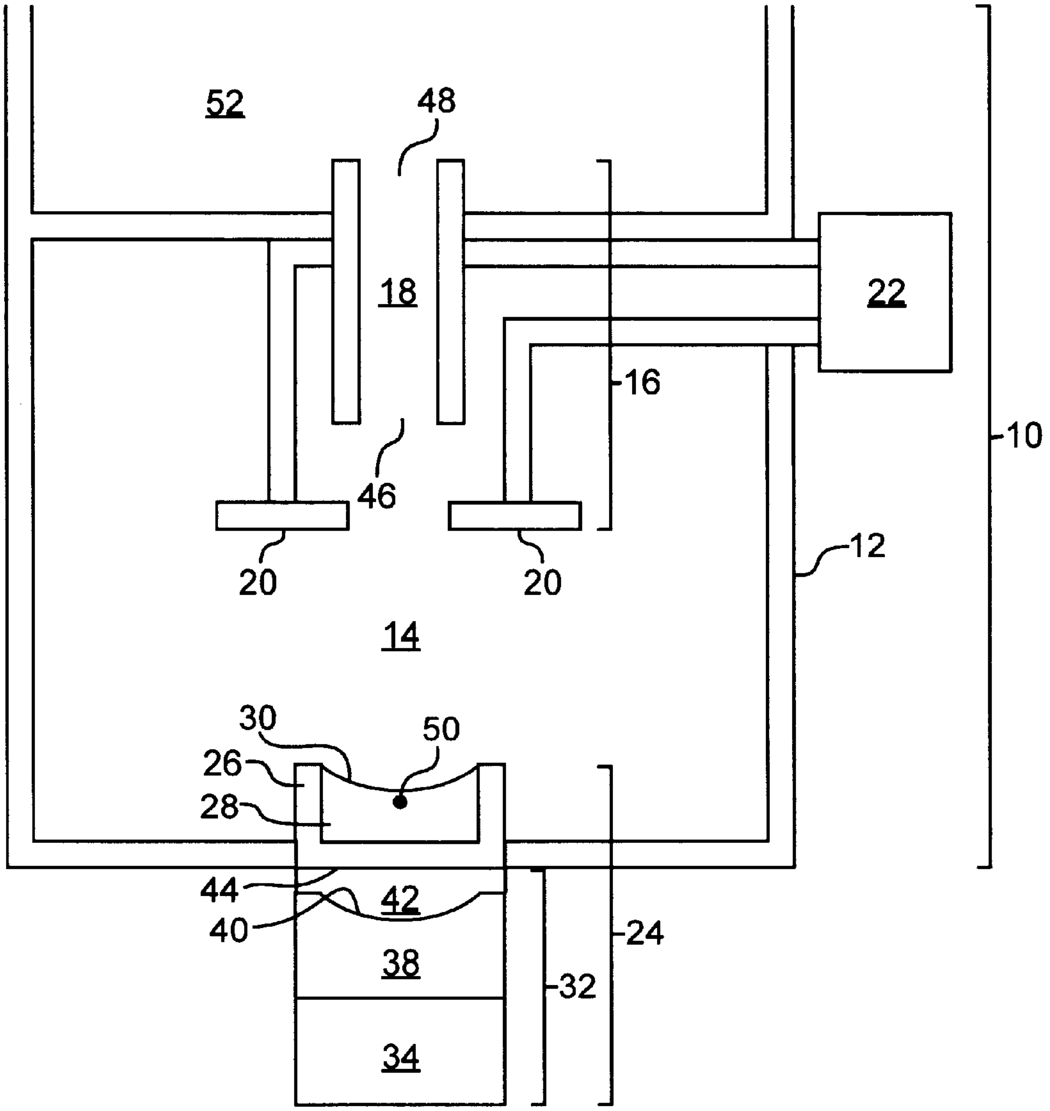
FIG. 1 illustrates in cross-sectional schematic view a first embodiment of a device having an ionization chamber that employs acoustic ejection for fluid sample delivery.

Before describing the present invention in detail, it is to be understood that this invention is not limited to specific fluids, biomolecules or device structures, as such may vary. It is also to be understood that the terminology used herein is for the purpose of describing particular embodiments only, and is not intended to be limiting.

It must be noted that, as used in this specification and the appended claims, the singular forms "a," "an" and "the" include plural referents unless the context clearly dictates otherwise. Thus, for example, reference to "a reservoir" includes a plurality of reservoirs, reference to a fluid" includes a plurality of fluids, reference to "a biomolecule" includes a combination of biomolecules, and the like.

In describing and claiming the present invention, the following terminology will be used in accordance with the definitions set out below.

The terms "acoustic coupling" and "acoustically coupled" used herein refer to a state wherein an object is placed in direct or indirect contact with another object so as to allow acoustic radiation to be transferred between the objects without substantial loss of acoustic energy. When two items are indirectly acoustically coupled, an "acoustic coupling medium" is needed to provide an intermediary through which acoustic radiation may be transmitted. Thus, an ejector may be acoustically coupled to a fluid, e.g., by immersing the ejector in the fluid or by interposing an acoustic coupling medium between the ejector and the fluid to transfer acoustic radiation generated by the ejector through the acoustic coupling medium and into the fluid.

The term "adsorb" as used herein refers to the noncovalent retention of a molecule by a substrate surface. That is, adsorption occurs as a result of noncovalent interaction between a substrate surface and adsorbing moieties present on the molecule that is adsorbed. Adsorption may occur through hydrogen bonding, van der Waal's forces, polar attraction or electrostatic forces (i.e., through ionic bonding). Examples of adsorbing moieties include, but are not limited to, amine groups, carboxylic acid moieties, hydroxyl groups, nitroso groups, sulfones and the like.

The term "array" used herein refers to a two-dimensional arrangement of features such as an arrangement of reservoirs (e.g., wells in a well plate) or an arrangement of fluid droplets or molecular moieties on a substrate surface (as in an oligonucleotide or peptidic array). Arrays are generally comprised of regular, ordered features, as in, for example, a rectilinear grid, parallel stripes, spirals, and the like, but non-ordered arrays may be advantageously used as well. An array differs from a pattern in that patterns do not necessarily contain regular and ordered features. Neither arrays nor patterns formed using the devices and methods of the invention have optical significance to the unaided human eye. For example, the invention does not involve ink printing on paper or other substrates in order to form letters, numbers, bar codes, figures, or other inscriptions that have optical significance to the unaided human eye. In addition, arrays and patterns formed by the deposition of ejected droplets on a surface as provided herein are preferably substantially invisible to the unaided human eye. Arrays typically but do not necessarily comprise at least about 4 to about 10,000,000 features, generally in the range of about 4 to about 1,000,000 features.

The term "attached," as in, for example, a substrate surface having a molecular moiety "attached" thereto (e.g., in the individual molecular moieties in arrays generated using the methodology of the invention) includes covalent binding, adsorption, and physical immobilization. The terms "binding" and "bound" are identical in meaning to the term "attached."

The term "biomolecule" as used herein refers to any organic molecule, whether naturally occurring, recombinantly produced, or chemically synthesized in whole or in part, that is, was or can be a part of a living organism. The term encompasses, for example, nucleotides, amino acids and monosaccharides, as well as oligomeric and polymeric species such as oligonucleotides and polynucleotides, peptidic molecules such as oligopeptides, polypeptides and proteins, and saccharides such as disaccharides, oligosaccharides, polysaccharides, and the like.

It will be appreciated that, as used herein, the terms "nucleoside" and "nucleotide" refer to nucleosides and nucleotides containing not only the conventional purine and pyrimidine bases, i.e., adenine (A), thymine (T), cytosine (C), guanine (G) and uracil (U), but also protected forms thereof, e.g., wherein the base is protected with a protecting group such as acetyl, difluoroacetyl, trifluoroacetyl, isobutyryl or benzoyl, and purine and pyrimidine analogs. Suitable analogs will be known to those skilled in the art and are described in the pertinent texts and literature. Common analogs include, but are not limited to, 1-methyladenine, 2-methyladenine, $N^6$-methyladenine, $N^6$-isopentyladenine, 2-methylthio-$N^6$-isopentyladenine, N,N-dimethyladenine, 8-bromoadenine, 2-thiocytosine, 3-methylcytosine, 5-methylcytosine, 5-ethylcytosine, 4-acetylcytosine, 1-methylguanine, 2-methylguanine, 7-methylguanine, 2,2-dimethylguanine, 8-bromoguanine, 8-chloroguanine, 8-aminoguanine, 8-methylguanine, 8-thioguanine, 5-fluorouracil, 5-bromouracil, 5-chlorouracil, 5-iodouracil, 5-ethyluracil, 5-propyluracil, 5-methoxyuracil, 5-hydroxymethyluracil, 5-(carboxyhydroxymethyl)uracil, 5-(methylaminomethyl)uracil, 5-(carboxymethylaminomethyl)-uracil, 2-thiouracil, 5-methyl-2-thiouracil, 5-(2-bromovinyl)uracil, uracil-5-oxyacetic acid, uracil-5-oxyacetic acid methyl ester, pseudouracil, 1-methylpseudouracil, queosine, inosine, 1-methylinosine, hypoxanthine, xanthine, 2-aminopurine, 6-hydroxyaminopurine, 6-thiopurine and 2,6-diaminopurine. In addition, the terms "nucleoside" and "nucleotide" include those moieties that contain not only conventional ribose and deoxyribose sugars, but other sugars as well. Modified nucleosides or nucleotides also include modifications on the sugar moiety, e.g., wherein one or more of the hydroxyl groups are replaced with halogen atoms or aliphatic groups, or are functionalized as ethers, amines, or the like.

As used herein, the term "oligonucleotide" shall be generic to polydeoxynucleotides (containing 2-deoxy-D-ribose), to polyribonucleotides (containing D-ribose), to any other type of polynucleotide which is an N-glycoside of a purine or pyrimidine base, and to other polymers containing nonnucleotidic backbones, providing that the polymers contain nucleobases in a configuration that allows for base pairing and base stacking, such as is found in DNA and RNA. Thus, these terms include known types of oligonucleotide modifications, for example, substitution of one or more of the naturally occurring nucleotides with an analog, internucleotide modifications such as, for example, those with uncharged linkages (e.g., methyl phosphonates, phosphotriesters, phosphoramidates, carbamates, etc.), with negatively charged linkages (e.g., phosphorothioates, phosphorodithioates, etc.), and with positively charged linkages (e.g., aminoalklyphosphoramidates, aminoalkylphosphotriesters), those containing pendant moieties, such as, for example, proteins (including nucleases, toxins, antibodies, signal peptides, poly-L-lysine, etc.), those with intercalators (e.g., acridine, psoralen, etc.), those containing chelators (e.g., metals, radioactive metals, boron, oxidative metals, etc.). There is no intended distinction in length between the term "polynucleotide" and "oligonucleotide," and these terms will be used interchangeably. These terms refer only to the primary structure of the molecule. As used herein the symbols for nucleotides and polynucleotides are according to the IUPAC-IUB Commission of Biochemical Nomenclature recommendations (*Biochemistry* 9:4022, 1970).

"Peptidic" molecules refer to peptides, peptide fragments, and proteins, i.e., oligomers or polymers wherein the constituent monomers are alpha amino acids linked through amide bonds. The amino acids of the peptidic molecules herein include the twenty conventional amino acids, stereoisomers (e.g., D-amino acids) of the conventional amino acids, unnatural amino acids such as $\alpha,\alpha$-disubstituted amino acids, N-alkyl amino acids, lactic acid, and other unconventional amino acids. Examples of unconventional amino acids include, but are not limited to, $\beta$-alanine, naphthylalanine, 3-pyridylalanine, 4-hydroxyproline, O-phosphoserine, N-acetylserine, N-formylmethionine, 3-methylhistidine, 5-hydroxylysine, and nor-leucine.

The term "capillary" is used herein to refer to a conduit having a bore of small dimension. Typically, capillaries for electrophoresis which are free standing tubes have an inner diameter in the range of about 50 to about 250 $\mu$m. Capillaries with extremely small bore integral to other devices such as openings for loading microchannels of microfluidic devices can be as small as 1 $\mu$m, but in general these capillary opening are in the range of about 10 to about 100 $\mu$m. In the context of delivery to a mass analyzer in electrospray type mass spectrometry, the inner diameter of capillaries may range from about 0.1 to about 3 mm and preferably about 0.5 to about 1 mm.

The term "fluid" as used herein refers to matter that is nonsolid or at least partially gaseous and/or liquid. A fluid may contain a solid that is minimally, partially or fully solvated, dispersed or suspended. Examples of fluids include, without limitation, aqueous liquids (including water per se and salt water) and nonaqueous liquids such as organic solvents and the like. As used herein, the term "fluid" is not synonymous with the term "ink" in that an ink must contain a colorant and may not be gaseous and/or liquid.

The term "focusing means" as used herein refers to a device that causes acoustic waves to converge at a focal point by an action analogous to that of an optical lens. A focusing means may be as simple as a solid member having a curved surface, or it may include complex structures such as those found in Fresnel lenses, which employ diffraction in order to direct acoustic radiation.

The term "ion" is used in its conventional sense to refer to a charged atom or molecule, i.e., an atom or molecule that contains an unequal number of protons and electrons. Positive ions contain more protons than electrons, and negative ions contain more electrons than protons. Ordinarily, an ion of the present invention is singly charged, but may in certain instances have a multiple charge.

Accordingly, the term "ionization chamber" as used here refers to a chamber in which ions are formed from samples, fluid or otherwise, containing an analyte molecule.

"Limiting dimension" of an opening refers to the maximum theoretical diameter of a sphere that can pass through the opening without deformation. For example, the limiting dimension of circular opening is the diameter of the opening. As another example, the limiting dimension of a rectangular opening is the length of the shorter side of the rectangular opening.

The term "nonmetallic" refers to analyte molecules that are not substantially purely metallic. Thus, for example, the term may be used to refer to compounds that contain metals such as organometallics and salts such as sodium chloride but may not be used to refer to alloys such as brass.

The term "reservoir" as used herein refers to a receptacle or chamber for holding or containing a fluid. Thus, a fluid in a reservoir necessarily has a free surface, i.e., a surface that allows a droplet to be ejected therefrom. In its one of its simplest forms, a reservoir consists of a solid surface having sufficient wetting properties to hold a fluid merely due to contact between the fluid and the surface.

The term "substrate" as used herein refers to any material having a surface onto which one or more fluids may be deposited or ejected. The substrate may be constructed in any of a number of forms such as wafers, slides, well plates, membranes, for example. In addition, the substrate may be porous or nonporous as may be required for any particular fluid deposition. Suitable substrate materials include, but are not limited to, supports that are typically used for solid phase chemical synthesis, e.g., polymeric materials (e.g., polystyrene, polyvinyl acetate, polyvinyl chloride, polyvinyl pyrrolidone, polyacrylonitrile, polyacrylamide, polymethyl methacrylate, polytetrafluoroethylene, polyethylene, polypropylene, polyvinylidene fluoride, polycarbonate, divinylbenzene styrene-based polymers), agarose (e.g., Sepharose®), dextran (e.g., Sephadex®), cellulosic polymers and other polysaccharides, silica and silica-based materials, glass (particularly controlled pore glass, or "CPG") and functionalized glasses, ceramics, and such substrates treated with surface coatings, e.g., with microporous polymers (particularly cellulosic polymers such as nitrocellulose), metallic compounds (particularly microporous aluminum), or the like. While the foregoing support materials are representative of conventionally used substrates, it is to be understood that the substrate may in fact comprise any biological, nonbiological, organic and/or inorganic material, and may be in any of a variety of physical forms, e.g., particles, strands, precipitates, gels, sheets, tubing, spheres, containers, capillaries, pads, slices, films, plates, slides, and the like, and may further have any desired shape, such as a disc, square, sphere, circle, etc. The substrate surface may or may not be flat, e.g., the surface may contain raised or depressed regions.

The term "surface modification" as used herein refers to the chemical and/or physical alteration of a surface by an additive or subtractive process to change one or more chemical and/or physical properties of a substrate surface or a selected site or region of a substrate surface. For example, surface modification may involve (1) changing the wetting properties of a surface, (2) functionalizing a surface, i.e., providing, modifying or substituting surface functional groups, (3) defunctionalizing a surface, i.e., removing surface functional groups, (4) otherwise altering the chemical composition of a surface, e.g., through etching, (5) increasing or decreasing surface roughness, (6) providing a coating on a surface, e.g., a coating that exhibits wetting properties that are different from the wetting properties of the surface, and/or (7) depositing particulates on a surface.

In general, the invention relates to the efficient transport of a small fluid sample such as that may be required by analytical devices such as mass spectrometers configured to analyze small samples of biomolecular fluids. Such transport typically involves nozzleless ejection. Thus, one embodiment of the invention relates to an analytical device having an ionization chamber for analyzing an analyte molecule wherein the molecule is introduced using an acoustic ejector for introducing the analyte molecule from a reservoir holding a fluid sample comprised of analyte molecule. The ejector comprises an acoustic radiation generator for generating acoustic radiation and a focusing means for focusing the acoustic radiation at a focal point near the surface of the fluid sample. Furthermore, a means for positioning the ejector in acoustic coupling relationship to the reservoir is provided. The analytical device may, for example be a time-of-flight mass spectrometer and allows for analysis of various types of analytes such as biomolecular analytes having a high molecular weight.

FIG. 1 schematically illustrates an electrospray ionization chamber of a mass spectrometer. The ionization chamber 10 comprises a housing 12 containing an ionization region 14, preferably operated substantially at or near atmospheric pressure, a vacuum interface 16 comprising a capillary 18 and an electrode 20 for attracting ions towards the vacuum interface 16, and optionally a drying gas source 22. An ejector assembly 24 is also provided that includes a reservoir 26 containing a fluid sample 28 having a fluid surface 30 in the ionization chamber 10. The ejector assembly 24 also includes an acoustic ejector 32 comprised of an acoustic radiation generator 34 for generating acoustic radiation and a focusing means 38 for focusing the acoustic radiation at a focal point within the fluid from which a droplet is to be ejected, near the fluid surface. As shown in FIG. 1, the focusing means 38 may comprise a single solid piece having a concave surface 40 for focusing acoustic radiation, but the focusing means may be constructed in other ways as discussed below. The acoustic ejector 32 is acoustically coupled to the reservoir 26 and thus to fluid sample 28. The acoustic radiation generator 34 and the focusing means 38 may function as a single unit controlled by a single controller (not shown), or they may be independently controlled, depending on the desired performance of the device.

As discussed above, the inventive device is typically constructed to handle small amounts of sample fluid. Most often, the inventive device is constructed for analysis of nonmetallic analyte molecules. In such a case, the analyte molecule may be an organic compound. When the organic compound is a biomolecule, it is often the case with nucleotidic and peptidic moieties that a sample may have a wide range of molecular weights, e.g., about 100 daltons to about 100 kilodaltons. The inventive device is particularly suitable for analyte molecules having a molecular weight of about 1 to about 100 kilodaltons. In addition, the analyte molecules are often provided in aqueous solutions. In the case of rare or expensive fluid samples, the inventive device may employ fluid sample volumes of less than about 100 μl. In some circumstances, the fluid sample may occupy a volume of no more than about 10 μl. Preferably, the fluid sample occupies a volume of no more than about 1 μl. Optimally, the fluid sample occupies a volume of about 10 pl to about 100 nl.

As will be appreciated by those skilled in the art, any of a variety of focusing means may be employed in conjunction with the present invention. In addition, there are also a number of ways to acoustically couple the ejector 32 to the reservoir and thus to the fluid therein. Thus, various means for positioning the ejection in acoustic coupling relationship to the reservoir are generally known in the art and may involve, e.g., devices that provide movement in one, two, three, four, five six or more degrees of freedom. The design and construction of acoustic ejector assemblies are also described, e.g., in U.S. patent application Ser. No. 09/669,996. Optimally, acoustic coupling is achieved between the ejector and the reservoir through indirect contact, as illustrated in FIG. 1. In the figure, an acoustic coupling medium 42 is placed between the ejector 32 and the base 44 of reservoir 26, with the ejector and reservoir located at a predetermined distance from each other. The acoustic coupling medium 42 may be an acoustic coupling fluid, preferably an acoustically homogeneous material in conformal contact with both the acoustic focusing means and the reservoir. In addition, it is important to ensure that the fluid medium is substantially free of material having different acoustic properties than the fluid medium itself. As shown, the reservoir 26 is acoustically coupled to the acoustic focusing means 38 such that an acoustic wave is generated by the acoustic radiation generator 34 and directed by the focusing means into the acoustic coupling medium, which then transmits the acoustic radiation into the reservoir.

The interface 16 is positioned relative to the ejector assembly to allow the ejector to acoustically eject droplets from the reservoir directly into the interface. As illustrated, all components of the vacuum interface are electrically connected. The vacuum interface as illustrated in FIG. 1 comprises a capillary with an inlet 46 and an exit 48, and optional means of introducing drying gas into the ionization chamber. The capillary is typically fabricated from glass and/or metal.

The vacuum interface may be electrically connected with the housing of the ionization chamber and is typically operated at approximately ground potential, that is, at a voltage of between typically about −50 volts and about 50 volts, more preferably at a voltage of between about −10 volts and about 10 volts. The housing may be fabricated from any material providing the requisite structural integrity and which does not significantly degrade, corrode, or out gas under typical conditions of use. Typical housings are fabricated from materials including metals such as stainless steel, aluminum, and aluminum alloys, and other electrically conductive materials. Parts of the housing may include plastics, such as Delrin acetal resin (trademark of Du Pont) and Teflon fluorocarbon polymer (trademark of Du Pont). In addition, composite or multilayer materials may also be used.

In operation, the reservoir 26 of the ejector assembly is filled with the fluid sample 28, as shown in FIG. 1. The acoustic ejector is positioned in order to achieve acoustic coupling between the ejector 32 and the reservoir 26 through an acoustic coupling medium 42. The ejection assembly is operated such that a high voltage difference is generated between the sample 28 and the vacuum interface 16, the ejection assembly preferably at approximately ground. Means of supplying the low voltage to the ejection assembly typically include wires and electrical contacts. During operation, an electrical potential difference is generated between the electrode of the vacuum interface and the ejector on the order of about 1,000 volts to about 8,000 volts. As an alternative, the vacuum interface voltage may be at ground. As a further alternative, both the vacuum interface and the electrode may not be at ground potential yet still exhibit a high potential difference therebetween. In any case, one of ordinary skill in the art will recognize that a nonconductive acoustic coupling material may be selected to serve to isolate the acoustic generator from high voltages that may be present at the reservoir. This may involve the use of highly deionized water or fluids with low electrical conductivity such as is the case with many alkanes, fluorinated alkanes, silicones and other nonpolar organic solvents.

With reference to FIG. 1, once the ejector 32, the reservoir 26 and the inlet 46 are in proper alignment, the acoustic radiation generator 34 is activated to produce acoustic radiation that is directed by the focusing means 38 to a focal point 50 near the fluid surface 30 of the reservoir 26. As a result, a droplet is ejected from the fluid surface into the interface 16. The ionization region 14 within the ionization chamber 10 is optionally operated substantially at or near atmospheric pressure, that is, preferably between about 660 torr and about 860 torr, more preferably at or about 760 torr. The temperature within the ionization chamber is typically from about 20° C. to about 100° C. Operation at ambient temperature is convenient and suitable for many applications. The droplets ejected are charged under the influence of the electric field generated within the ionization chamber due to the potential difference between the ejection assembly 24 and the vacuum interface 16. That is, the electrode 20 of the vacuum interface 16 locally charges the surface 30 of the fluid sample 28 from which the droplets are ejected. As a result, the droplets are also charged. The charged droplets are then evaporated and desolvated by heating or under the influence of drying gas introduced into the ionization chamber. The ions are induced to exit the ionization region 14 via an inlet 46 of the capillary 18, by application of an electrical potential to electrode 20. The ions entering the vacuum interface subsequently enter into a vacuum region 52 that contains a mass analyzer or detector, not shown. Examples of such mass analyzers include multipole detectors such as quadruple detectors that employ a charged surface that attracts or repels the ionized analyte molecule.

Similarly, other charged surfaces may be placed in the ionization chamber to direct the trajectory of ionized droplets. In other words, the trajectory of ejected droplets may intersect one or more electric fields. To further ensure controlled ion delivery, the ejector is configured to eject small droplets having a substantially identical volume. Small droplet size allows for rapid desolvation. Uniform droplet volume leads to reproducible analysis. Typically, the volume of each ejected droplet does not exceed about 1 nl. Preferably, the volume of each ejected droplet is no more than about 1 pl. In some cases, the ejector may be configured to eject a droplet having a volume of no more than about 100 femtoliters. In addition, in some cases, the ejector may be configured to eject no more than about 5 percent of the fluid sample per droplet. Thus, by repeatably applying the same acoustic energy to a fluid surface, droplets having substantially identical trajectories can be ejected.

In another embodiment, the invention pertains to an analytical device having an ionization chamber for analyzing an analyte molecule wherein the molecule is introduced using an acoustic ejector for introducing the analyte molecule from a plurality of reservoirs each holding a fluid sample comprised of analyte molecule. The ejector comprises an acoustic radiation generator for generating acoustic radiation and a focusing means for focusing the acoustic radiation at a focal point near the surface of the fluid sample. Furthermore, a means for positioning the ejector in acoustic coupling relationship to the reservoirs is provided.

FIG. 2 schematically illustrates another electrospray ionization chamber of a mass spectrometer. The ionization chamber 10 comprises a housing 12, and an vacuum interface 16 comprising a opening 18 through plate 20. An ejector assembly 24 is also provided that includes a substantially planar substrate 26 having flat parallel opposing surfaces, indicated at 54 and 56, the upper surface 54 having a plurality of designated sites thereon, indicated at 58 and 60, the sites representing reservoirs containing fluid samples, indicated at 28 and 62 having fluid surfaces 30 and 64, respectively. In other words, the reservoirs are provided as integrated members of a single substrate wherein the reservoirs comprise designated sites on a surface of the substrate. As shown, the reservoirs are arranged in an array. The ejector assembly 24 also includes an acoustic ejector 32 comprised of an acoustic radiation generator 34 for generating acoustic radiation and a focusing means 38 for focusing the acoustic radiation at a focal point within the fluid from which a droplet is to be ejected near the fluid surface. The focusing means 38 is shown comprising a single solid piece having a concave surface 40 for focusing acoustic radiation. The acoustic ejector 32 is acoustically coupled to the substrate 26 through its lower surface 56. Thus, by proper positioning of the ejector to each designated site, the ejector can be coupled to each fluid sample.

In the alternative, commercially available well plates may also be employed as reservoirs for the present invention. Such well plates may comprise 96, 384 or even 1536 reservoirs. Manufactures of such well plates include Corning Inc. (Corning, N.Y.) and Greiner America, Inc. (Lake Mary, Fla.). The wells of these well plates are typically arranged in rectilinear arrays wherein each interior well has four closest neighbors.

Figure 2A:
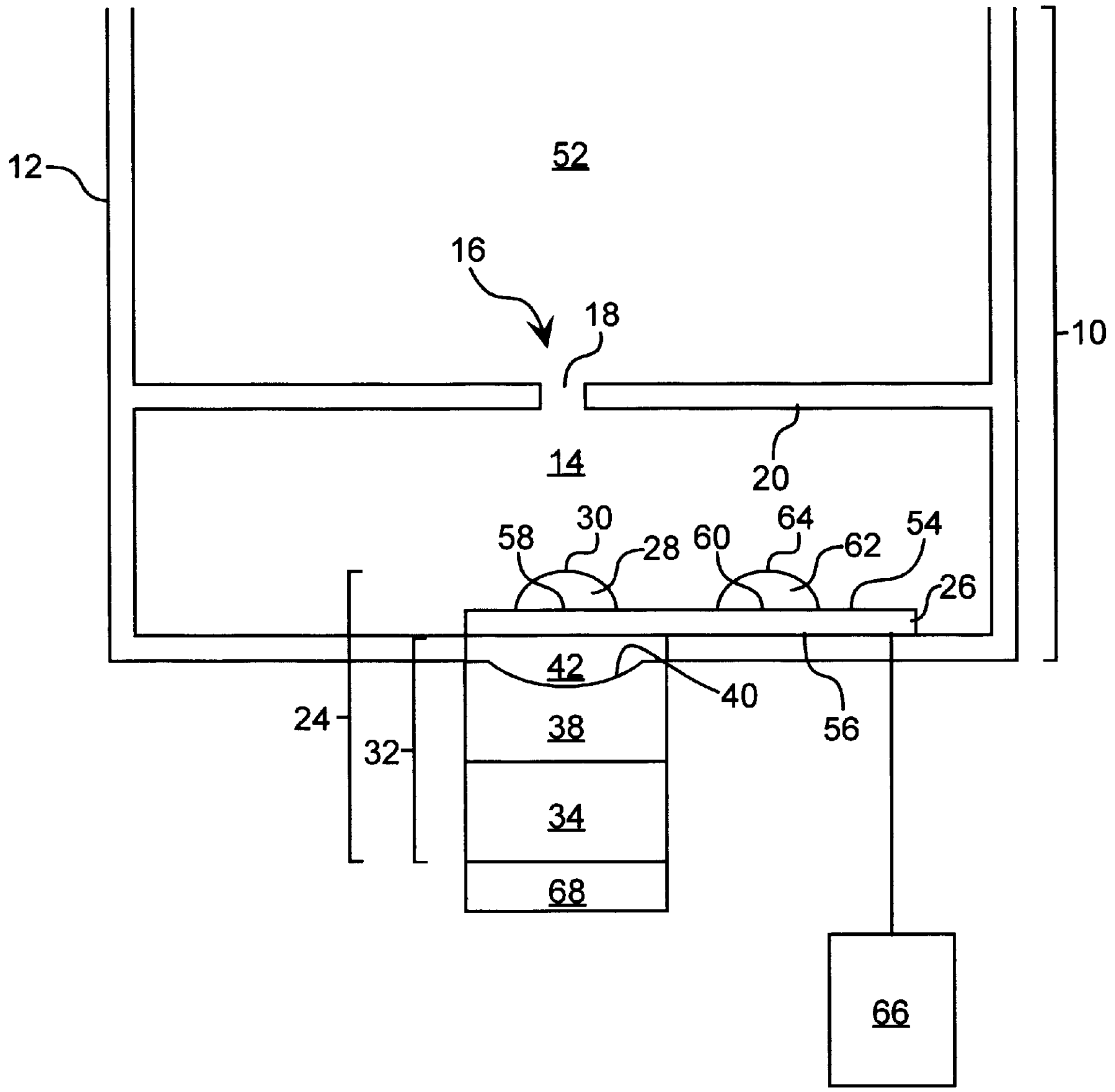
FIGS. 2A and 2B, collectively referred to as FIG. 2, illustrate in cross-sectional schematic view another embodiment of a device having an ionization chamber that employs acoustic ejection to deliver a plurality of fluid samples for analysis.

As shown in FIG. 2A, acoustic coupling is achieved between the ejector 32 and reservoir 58 through indirect contact through an acoustic coupling medium 42 interposed between the ejector 32 and the lower surface 56 of the substrate 26 with the ejector 32 and substrate 26 located at a predetermined distance from each other. The relative position of the interface 12 with respect to the ejector assembly 32 is situated to allow the ejector to acoustically eject droplets from the substrate 26 directly into the interface opening 18.

In operation, each reservoir of the device is filled with a fluid sample, as shown in FIG. 2. In addition, a charging means 66 such as an electrostatic generator provides electrical contact with the substrate 26 to add or subtract electrons thereto in order to electrostatically charge the sample 28 in reservoir 58. The construction of such electrostatic charge generators is known in the art. When all reservoirs are electrically connected, all fluid samples may be simultaneously charged. However, depending on the construction of the electrostatic generator and the reservoirs, the fluid samples may be charged in succession, e.g., as droplets are ejected in succession from the reservoirs.

In order to eject droplets from the reservoirs 58, 60 in succession, the ejector must be positioned in acoustic coupling relationship with the reservoirs. However, in order to ensure that the droplets follow the desired trajectory, the ejector, the reservoirs and the interface must be precisely and accurately aligned. Such alignment can be performed through a number of techniques. For example, the designated sites on the substrate may be marked so as to identify the location of the sites at which acoustic coupling may take place. In addition, since the acoustic properties of the designated sites are different from the other portions of the substrate, it is preferred that the device further comprises an acoustic detector 68 for detecting reflected acoustic radiation from the fluid samples. Such a detector may be configured to provide information relating to the position and orientation of the fluid surface from which droplets may be ejected. That is, when the substrate is acoustically coupled to the acoustic radiation generator, the generator is activated to produce a detection acoustic wave that travels through the substrate, and if a fluid surface is present, the wave is reflected thereby as a reflected acoustic wave. In other words, the radiation generator in combination with the focusing means can function as an acoustic microscope as well as the drop generator. Parameters of the reflected acoustic radiation are then analyzed in order to assess the spatial relationship between the acoustic radiation generator and the fluid surface. Such an analysis at a minimum may be used to detect whether a fluid is present and may be expanded to determine the distance between the acoustic radiation generator and the fluid surface and/or the orientation of the fluid surface in relationship to the acoustic radiation generator.

More particularly, the acoustic radiation generator may activated so as to generate low energy acoustic radiation that is insufficiently energetic to eject a droplet from the fluid surface. This is typically done by using an extremely short pulse (on the order of tens of nanoseconds) relative to that normally required for droplet ejection (on the order of microseconds). By determining the time it takes for the acoustic radiation to be reflected by the fluid surface back to the acoustic radiation generator and then correlating that time with the speed of sound in the fluid, the distance—and thus the fluid height—may be calculated. Of course, care must be taken in order to ensure that acoustic radiation reflected by the interface between the reservoir base and the fluid is discounted. It will be appreciated by those of ordinary skill in the art that such a method employs conventional or modified sonar techniques.

Once the analysis has been performed, an ejection acoustic wave having a focal point near the fluid surface is generated in order to eject at least one droplet of the fluid, wherein the optimum intensity and directionality of the ejection acoustic wave is determined using the aforementioned analysis optionally in combination with additional data. The "optimum" intensity and directionality are generally selected to produce droplets of consistent size and velocity. For example, the desired intensity and directionality of the ejection acoustic wave may be determined by using not only the spatial relationship assessed as above, but also geometric data associated with the reservoir, fluid property data associated with the fluid to be ejected, and/or by using historical droplet ejection data associated with the ejection sequence. In addition, the data may show the need to reposition the ejector so as to reposition the acoustic radiation generator with respect to the fluid surface, in order to ensure that the focal point of the ejection acoustic wave is near the fluid surface, where desired. For example, if analysis reveals that the acoustic radiation generator is positioned such that the ejection acoustic wave cannot be focused near the fluid surface, the acoustic radiation generator is repositioned using vertical, horizontal and/or rotational movement to allow appropriate focusing of the ejection acoustic wave.

Precision alignment between the acoustic ejector and the opening for the sample is particularly important if the size of the droplet approaches the size of the opening. Since, as discussed above the combination of the acoustic radiation generator and acoustic focusing means can be used as an acoustic microscope, the combination, in some instances, can be used to locate the interface opening by sonar methods known to those versed in the art of acoustic microscopy. The acoustic coupling between the transducer and opening may not be sufficient to provide a strong enough reflection for the measurement in the specific configuration used for sample loading. The signal strength can be raised by a variety of methods including the change in frequency to one with less attenuation for the given acoustic path, the use of better acoustic coupling materials in the acoustic path, or the reduction in vertical distance between transducer and opening.

A processor could direct a motion system to change the relative position of the acoustic ejector and the interface opening to bring the acoustic generator and opening into proper alignment. Achievement of the proper position can be verified by acoustic means. Usually, the proper position to insure the trajectory of drops emitted from the reservoir will enter the opening is a co-axial alignment (centerline of transducer being co-linear with centerline of opening). Factors other than initial velocity vector contribute to the drop trajectory (such as droplet charge and local electric fields). Hence, a non-coaxial alignment may be required in order for drops emitted by the activation of the transducer to have a trajectory into the interior of the opening. The alignment for these situations and can be either calculated or determined experimentally.

Figure 2B:
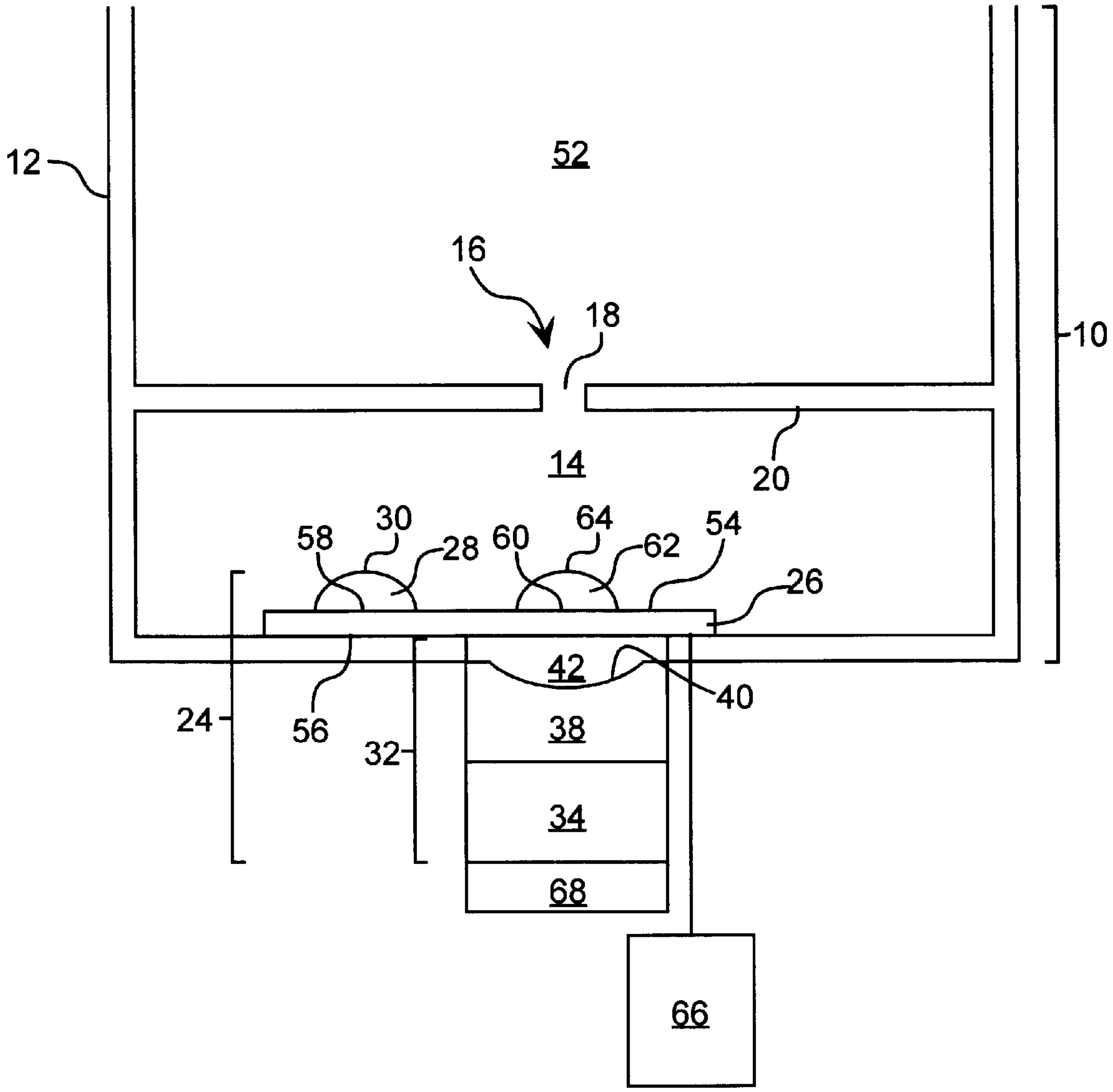

Thus, as shown in FIG. 2A, the acoustic ejector 32 is positioned below reservoir 58, in order to achieve acoustic coupling between the ejector 32 and the reservoir through acoustic coupling medium 42. An acoustic detector 68 ensures that the reservoir 58 and the ejector 32 are properly aligned. Once the ejector 32, the reservoir 58 and the inlet opening are in proper alignment, the acoustic radiation generator 34 is activated to produce acoustic radiation that is directed by the focusing means to a focal point near the fluid surface of the reservoir. As a result, the droplet is ejected from the fluid surface into the vacuum interface opening 18. Then, as shown in FIG. 2B, the substrate 26 is repositioned by a reservoir positioning means (not shown) and the ejection process is repeated such that the ejector is located below reservoir 60 to eject droplets therefrom. The charged droplets may then be evaporated and desolvated by heating or under the influence of drying gas introduced into the ionization chamber, as described above. The ions then travel through the vacuum interface opening 18 and enter into the vacuum region 52 that contains a mass analyzer or detector (not shown).

From the above, it is evident that it is sometimes advantageous to fix the relative positions of the ejector with respect to the ionization chamber and to position the reservoirs accordingly in order to eject droplets from the reservoirs. However, the relative positions and spatial orientation of the various components may be altered depending on the particular desired task at hand. In such a case, the various components of the device may require individual control or synchronization to direct droplets into an ionization chamber. For example, the ejector positioning means may be adapted to eject droplets from each reservoir in a predetermined sequence associated with an array of reservoirs on the substrate surface. Similarly, the substrate positioning means for positioning the substrate surface with respect to the ejector may be adapted to position the substrate surface to ensure a proper droplet ejection sequence. Either or both positioning means, i.e., the ejector positioning means and the reservoir positioning means, may be constructed from, e.g., levers, pulleys, gears, a combination thereof, or other mechanical means known to one of ordinary skill in the art. It is preferable to ensure that there is a correspondence between the movement of the substrate with respect to the activation of the ejector to ensure proper synchronization. It is to be understood that means for positioning the ejector in acoustic coupling relationship to the reservoirs may be equivalent to means for positioning the reservoirs in acoustic coupling relationship to the ejector.

The above-described devices may be adapted to eject fluids of virtually any type and amount desired. The fluid may be aqueous and/or nonaqueous. The capability of producing fine droplets of such materials is in sharp contrast to piezoelectric technology or ordinary inkjet technology, insofar as piezoelectric systems are susceptible to clogging and problems associated with clogging such as misdirected droplet trajectory and/or improper droplet size. Furthermore, because of the precision that is possible using the inventive technology, the device may be used to eject droplets from a reservoir adapted to contain no more than the above described fluid sample volumes.

In addition, the rate at which fluid droplets can be delivered is related to the efficiency of fluid delivery. For example, the invention generally enables ejection of droplets at a rate of at least about 1,000,000 droplets per minute from the same reservoir, and at a rate of at least about 100,000 drops per minute from different reservoirs assuming that the droplet size does not exceed about 10 $\mu$m in diameter. One of ordinary skill in the art will recognize that the droplet generation rate is a function of drop size, viscosity, surface tension, and other fluid properties. In general, droplet generation rate increases with decreasing droplet diameter, and 1,000,000 droplets per minute is achievable for most aqueous fluid drops under about 10 $\mu$m in diameter. In addition, current positioning technology allows for the ejector positioning means to move from one reservoir to another quickly and in a controlled manner, thereby allowing fast and controlled ejection of different fluid samples. That is, current commercially available technology allows the ejector to be moved from one reservoir to another, with repeatable and controlled acoustic coupling at each reservoir, in less than about 0.1 second for high performance positioning means and in less than about 1 second for ordinary positioning means. A custom designed system will allow the ejector to be moved from one reservoir to another with repeatable and controlled acoustic coupling in less than about 0.001 second. In order to provide a custom designed system, it is important to keep in mind that there are two basic kinds of motion: pulse and continuous. Pulse motion involves the discrete steps of moving an ejector into position, emitting acoustic energy, and moving the ejector to the next position; again, using a high performance positioning means with such a method allows repeatable and controlled acoustic coupling at each reservoir in less than 0.1 second. A continuous motion design, on the other hand, moves the ejector and the reservoirs continuously, although not at the same speed, and provides for ejection during movement. Since the pulse width is very short, this type of process enables over 10 Hz reservoir transitions, and even over 1000 Hz reservoir transitions.

Thus, the invention also provides a method for preparing a plurality of analyte molecules for analysis. Such preparation involves applying focused acoustic energy to each of a plurality of fluid-containing reservoirs, each of said reservoirs containing an analyte molecule in a fluid to be applied to a designated site on the substrate surface in order to prepare array comprised of a plurality of analyte molecules on a substrate surface. Array preparation involving nozzleless acoustic ejection has been described in detail in a number of patent applications. See, e.g., U.S. Ser. Nos. 09/669,996, 09/669,997, and 09/669,267. In some instances, the array is allowed to dry and the analyte molecules are allowed to adsorb/crystallize on to the substrate. In other instances, the analyte molecules are attached to the substrate. Once the array is prepared, sufficient energy is successively applied to each site to ionize the analyte molecules and release the analyte molecules from the substrate surface for analysis. The energy may be applied, e.g., by bombarding the sites with photons, e.g., through use of a laser, electrons and/or ions. Ionization and release of analyte molecules may be enhanced through heating, directing focused acoustic energy to, and/or passing an electrical current through at least one site. Once released, the ions may be directed to a mass analyzer in a manner described above or through other known techniques.

It should be noted that such an array may have densities substantially higher than possible using current array preparation techniques such as capillary microspotting and piezoelectric techniques (e.g., using inkjet printing technology). The array densities that may be achieved using the devices and methods of the invention are at least about 1,000,000 biomolecules per square centimeter of substrate surface, preferably at least about 1,500,000 per square centimeter of substrate surface.

It should also be evident that due to the capabilities of acoustic ejection, another embodiment of the invention relates to a device for efficient transport of fluid sample. The device comprises a sample vessel having an inlet opening with a limiting dimension of no more than about 300 μm, a reservoir holding a fluid sample having a volume of no more than about 5 μl, and an ejector configured to eject at least about 25% of the fluid sample through the inlet opening into the sample vessel. Typically, the ejector comprises an acoustic radiation generator for generating radiation, a focusing means for directing the radiation at a focal point near the surface of the fluid sample, and a means for positioning the ejector in coupling relationship to the reservoir. Optionally, the ejector does not directly contact the radiation generator in which case the device further comprise a coupling fluid interposed between the ejector and the reservoir for acoustic coupling as described above. Similarly, another embodiment of the invention relates to a method for efficient transport of a droplet of a fluid sample, wherein a reservoir is provided containing a fluid sample having a volume of no more than about 5 μl, and at least 25% of the fluid sample is ejected in the form of individual droplets through an inlet opening of a sample vessel, the inlet opening having a limiting dimension of no more than about 300 μm wherein the size of the droplets approaches the limiting dimensions of the opening.

The efficiency of these embodiments lies in the ability to handle extremely small sized fluid samples with little or no sample waste. In these embodiments, then, the limiting dimension often does not exceed about 100 μm. Preferably, the limiting dimension does not exceed about 50 μm, and optimally, does not exceed about 20 μm. In addition, the reservoir volume may be no more than about about 1 μl, preferably no more than about 100 nl, and optimally no more than about 50 nl, and in some cases no more than about 500 pl. By controlling droplet size, droplet ejection may result in at least about 50% of the fluid, preferable at least about 75%, and optimally about 85% of the fluid sample passing through the inlet opening and into the sample vessel. Efficient droplet delivery also allows small vessels to be filled without reliance on surface wetting properties, though wetting may occur. This is particularly advantageous for sample vessels having an interior volume of no more than about 5 μl. In fact, it is likely that the present invention will allows sample vessels with extremely small interior volumes to be filled wherein the vessel volume is no more than about 1 μl, 100 nl, 50 nl, or even 500 pl.

This embodiment may be adapted to improve sample introduction for mass spectrometry. For example, mass spectrometry often employs an interface having a substantially flat surface where the inlet open is located on the flat surface. In addition or in the alternative, mass spectrometers may employ an interface comprising an axially symmetric capillary having an inlet opening located at a terminus wherein the inlet opening provides access to an interior region of the capillary. Such capillaries may be electrically conductive, electrically insulating or both at different portions. Such electrical properties are chosen according to desired electric fields for directing analyte ion trajectory.

Figure 3:
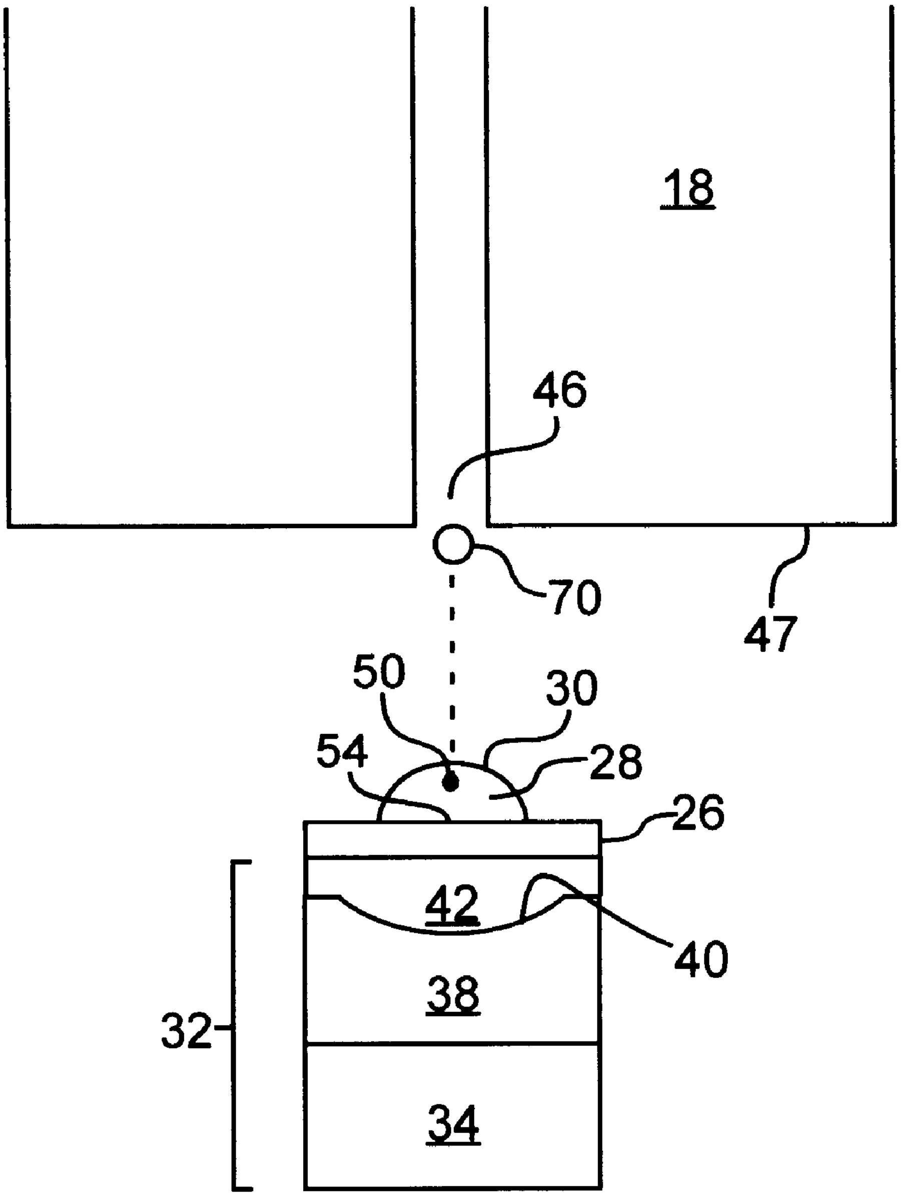
FIG. 3 illustrates in cross-sectional schematic view ejection of droplets of fluid from a hemispherical fluid sample source on a substrate surface into an inlet opening disposed on a terminus of a capillary.

This embodiment is illustrated in FIG. 3 wherein an axially symmetric capillary 18 having an inlet opening 46 disposed on a terminus 47 thereof is provided as a sample vessel. Due to the axial symmetry of the capillary 18, the inlet opening 46 has a circular cross sectional area. As such, the opening has a limiting dimension equal to its diameter. Due to the wall thickness of the capillary 18 with respect to the diameter of the inlet opening 46, it is evident that if the terminus 47 of the capillary 18 were submerged in a pool of fluid sample only a small portion of the fluid sample would be introduced into the interior of the capillary; the remainder would wet the exterior surface of the capillary terminus.

Thus, this embodiment provides for introduction of a small volume of fluid into a sample vessel having an opening with a small limiting dimension. Also shown in FIG. 3 is a hemispherical fluid sample 28 on a substantially flat substrate surface 54. The shape of the fluid sample 28 is a function of the sample wetting property with respect to the substrate surface 54. Thus, the shape can be modified with any of a number of surface modification techniques. In addition an ejector 32 is provided comprising an acoustic radiation generator 34 for generating radiation and a focusing means 38 for directing the radiation at a focal point 50 near the surface 30 of the fluid sample 28. The ejector 32 is shown in acoustic coupling relationship to the substrate 26 through coupling fluid 42. Proper control of acoustic wavelength and amplitude results in the ejection of droplet 70 from the fluid sample 28 on the substrate surface 54. As droplet 70 is shown having a diameter only slightly smaller than the diameter of the inlet opening 46, it should be evident that this requires alignment of the ejector 32, the sample fluid 28 and the capillary 18 which can be achieved using techniques known in the art or described supra.

It should be apparent, then, that in another embodiment, a device for efficient transport of fluid sample is provided. The device comprises: a sample vessel having an inlet opening with a limiting dimension of no more than about 300 μm, wherein the limiting dimension is preferably about 300 μm about 10 μm to; a reservoir holding a fluid sample having a depth of about 0.1 to about 30 times the limiting dimension of the inlet opening; and an ejector configured to eject a droplet of the fluid sample through the inlet opening into the sample vessel. The sample vessel of the device does not contact the fluid sample held by the reservoir. Typically, the droplet has a diameter smaller than the limiting dimension of the inlet opening. In some cases, the limiting dimension of the inlet opening is at least about 3 μm greater than the diameter of the droplet. In addition, the limiting dimension of the inlet opening may be no more than about 100 times the diameter of the droplet.

The ejector of such a device is typically an acoustic ejector configured to eject a droplet of the fluid sample through the inlet opening into the sample vessel, comprising an acoustic radiation generator for generating acoustic radiation and a focusing means for focusing the acoustic radiation at a focal point near the surface of the fluid sample, and further wherein the acoustic ejector is in acoustic coupling relationship to the reservoir. Typically, the acoustic radiation generator is configured to generate a predetermined wavelength selected according to the limiting dimension of the inlet opening. The predetermined wavelength is typically no greater than the limiting dimension of the inlet opening and preferably no greater than about 80% of the limiting dimension of the inlet opening. In addition or in the alternative, the predetermined wavelength is selected according to the depth of the fluid sample. In such a case, the predetermined wavelength typically is no greater than about 80%, preferably no greater than 50% and optimally no greater than 25% of the depth of the fluid sample.

Thus, a method is provided wherein a droplet is ejected from a fluid sample to a sample vessel having an inlet opening, wherein the inlet opening has a limiting dimension of no more than about 300 μm and the fluid sample has a depth of about 0.1 to about 30 times the limiting dimension. This can be achieved by employing acoustic droplet ejection, e.g., by using the an acoustic ejector described above. Regardless of the limiting dimension, the acoustic radiation generator for generating acoustic radiation having a predetermined wavelength may be selected according to the limiting dimension of the inlet opening or the depth of the fluid sample. The predetermined wavelength can be determined by one of ordinary skill in the art upon routine experimentation and in view of U.S. Pat. No. 4,751,529 to Elrod et al.

It is to be understood that while the invention has been described in conjunction with the preferred specific embodiments thereof, that the foregoing description as well as the example which follows are intended to illustrate and not limit the scope of the invention. Other aspects, advantages and modifications within the scope of the invention will be apparent to those skilled in the art to which the invention pertains.

All patents, patent applications, and publications mentioned herein are hereby incorporated by reference in their entireties.

EXAMPLE

A 2 nl fluid sample is loaded into a microfluidic device having a channel with an inlet opening wherein the opening has a limiting dimension of 25 μm. A 4 nl droplet of a micromolar solution of short DNA oligomers is deposited on a flat surface of a polystyrene-coated glass substrate. The wetting angle between the sample solution and the polystyrene surface is 90°. As a result, the liquid is driven by surface tension to form a hemispherical reservoir having a diameter of 424 μm and height of 212 μm. Located 500 μm above the polystyrene surface and 288 μm from the apex of the hemisphere is the center of the inlet opening to the microfluidic channel.

A generator of focused acoustic energy is positioned below the substrate and coupled acoustically through water that serves as a coupling medium. Acoustic energy is generated at a frequency of approximately 140 MHz and focused below the apex of the hemispherical reservoir. By sending in periodic pulses of a few microseconds of acoustic energy, a series of identically sized and substantially spherical droplets each having a 2 pl volume and about 16 μm diameters leave the reservoir and travel towards the inlet opening. A 250 Hz repetition rate of the pulse rate is generated, and 0.5 nl of the fluid sample per second is transferred through the opening as a result. The fluid transfer is continued until either the fluid depth becomes too shallow to support droplet formation or acoustic focus is lost. A reservoir having a depth of a few droplet diameters is sufficient to support droplet formation. Thus, for droplets having a diameter of 16 μm, ejection is stable for depths as little as 100 microns. That is, droplets having a diameter of 16 μm may be ejected from a hemispherical reservoir of fluid sample, wherein the diameter of the reservoir is under 200 μm. Hence, the original 4 nl hemisphere can be reduced in size by ejection of its fluid volume, leaving under about 12.5% of the original fluid volume. That is, less than 500 pl of fluid sample remains on the substrate surface after ejection, thereby resulting in a fluid sample delivery efficiency of about 87.5%.

We claim:

1. A method for preparing a plurality of analyte molecules for analysis, comprising:

(a) applying focused acoustic energy to each of a plurality of fluid-containing reservoirs, to eject a droplet of fluid containing an analyte molecule from each reservoir to a different designated site on a substrate surface, thereby forming an array comprised of a plurality of analyte molecules on the substrate surface; and (b) successively applying sufficient energy to each site to ionize the analyte molecules and release the analyte molecules from the substrate surface for analysis.

2. The method of claim 1, wherein step (b) comprises bombarding at least one site with photons, electrons, ions, or combinations thereof.

3. The method of claim 2, wherein each ionized and released analyte molecule is introduced into an ionization chamber of an analytical device.

4. The method of claim 3, wherein the analytical device is a mass spectrometer.

5. The method of claim 4, wherein the mass spectrometer is a time-of-flight mass spectrometer.

6. The method of claim 2, wherein the ejected droplets are substantially identical in size.

7. The method of claim 7, wherein no more than about 5 percent of the fluid in a reservoir is ejected per droplet.

8. The method of claim 3, wherein at least one analyte molecule has a molecular weight of about 100 daltons to about 100 kilodaltons.

9. The method of claim 8, wherein the molecular weight is about 1 to about 100 kilodaltons.

10. The method of claim 3, wherein least one analyte molecule has a molecular weight to charge ratio of about 100 daltons/charge to about 100 kilodaltons/charge.

11. The method of claim 3, wherein least one fluid comprises water.

12. The method of claim 3, wherein least one analyte molecule is nonmetallic.

13. The method of claim 12, wherein the at least one analyte molecule is an organic compound.

14. The method of claim 13, wherein the organic compound is a biomolecule.

15. The method of claim 14, wherein the biomolecule is nucleotidic.

16. The method of claim 14, wherein the biomolecule is peptidic.

17. The method of claim 2, further comprising, locating a surface of a fluid held by a reservoir before ejecting a droplet therefrom.

18. The method of claim 17, wherein the fluid surface is located by detecting for reflected acoustic radiation.

19. The method of claim 2, wherein step (b) comprises bombarding at least one site with photons.

20. The method of claim 19, wherein photonic bombardment is carried out using a laser.

21. The method of claim 2, wherein step (b) comprises bombarding at least one site with electrons.

22. The method of claim 2, wherein step (b) comprises bombarding at least one site with ions.

23. The method of claim 1, wherein step (b) comprises heating at least one site.

24. The method of claim 1, wherein step (b) comprises directing focused acoustic energy to at least one site.

25. The method of claim 1, wherein step (b) comprises passing an electrical current through at least one site.

26. The method of claim 2, wherein step (b) further comprises heating the at least one site.

27. The method of claim 2, wherein step (b) further comprises directing focused acoustic energy to the at least one site.

28. The method of claim 2, wherein step (b) further comprises passing an electrical current through the at least one site.

29. A device for preparing a plurality of analyte molecules for analysis, comprising:

a plurality of reservoirs each holding a fluid comprised of an analyte molecule;

an ejector comprising an acoustic radiation generator for generating acoustic radiation and a focusing means for focusing the acoustic radiation at a focal point near a surface of the fluid;

a means for positioning the ejector in acoustic coupling relationship to each of the reservoirs to eject a droplet of fluid therefrom;

a substrate having a surface adapted to receive droplets of fluid from the reservoirs:

a means for positioning the substrate so that designated sites on the substrate surface are successively placed in droplet-receiving relationship to the reservoirs, thereby forming an array comprised of a plurality of analyte molecules on the substrate surface; and a means for applying energy to each site in a manner sufficient to ionize the analyte molecules and to release the analyte molecules from the substrate surface for analysis.

30. The device of claim 29, wherein the means for applying energy bombards at least one site with photons, electrons, ions, or combinations thereof.

31. The device of claim 30, further comprising an ionization chamber for analyzing an analyte molecule ionized and released from the substrate surface.

32. The device of claim 31, wherein the device is a mass spectrometer.

33. The device of claim 32, wherein the mass spectrometer is a time-of-flight mass spectrometer.

34. The device of claim 33, wherein each fluid occupies a volume of no more than about 100 μl.

35. The device of claim 34, wherein each fluid occupies a volume of no more than about 10 μl.

36. The device of claim 35, wherein fluid occupies a volume of no more than about 1 μl.

37. The device of claim 36, wherein each fluid occupies a volume of about 10 pl to about 100 nl.

38. The device of claim 31, wherein the ejector is configured to eject a droplet having a volume of no more than about 1 nl.

39. The device of claim 38, wherein the ejector is configured to eject a droplet having a volume of no more than about 1 pl.

40. The device of claim 39, wherein the ejector is configured to eject a droplet having a volume of no more than about 100 fl.

41. The device of claim 31, wherein the ejector is configured to eject no more than about 5 percent of the fluid in a reservoir per droplet.

42. The device of claim 31, wherein least one analyte molecule has a molecular weight of about 100 daltons to about 100 kilodaltons.

43. The device of claim 42, wherein the molecular weight is about 1 to about 100 kilodaltons.

44. The device of claim 31, wherein at least one fluid further comprises water.

45. The device of claim 31, wherein at least one analyte molecule is nonmetallic.

46. The device of claim 45, wherein the at least one analyte molecule is an organic compound.

47. The device of claim 46, wherein the organic compound is a biomolecule.

48. The device of claim 47, wherein the biomolecule is nucleotidic.

49. The device of claim 47, wherein the biomolecule is peptidic.

50. The device of claim 31, further comprising a detector for detecting reflected acoustic radiation from the fluid.

51. The device of claim 31, further comprising a charged surface within the ionization chamber that attracts or repels an ionized analyte molecule.

52. The device of claim 51, wherein the charged surface is a surface of a multipole analyzer.

53. The device of claim 52, wherein the multipole analyzer is a quadrupole analyzer.

54. The device of claim 29, wherein the reservoirs are arranged in an array.

55. The device of claim 29, wherein the reservoirs are provided as integrated members of a single reservoir substrate.

56. The device of claim 55, wherein the reservoirs comprise designated sites on a surface of the reservoir substrate.

57. The device of claim 56, wherein the reservoir substrate surface is substantially flat.

58. The device of claim 29, wherein the device comprises 96 reservoirs.

59. The device of claim 29, wherein the device comprises 384 reservoirs.

60. The device of claim 29, wherein the device comprises 1536 reservoirs.

61. The device of claim 30, wherein the means for applying energy comprises a source of photons.

62. The device claim 61, wherein the means for applying energy comprises a laser.

63. The device of claim 30, wherein the means for applying energy comprises a source of electrons.

64. The device of claim 30, wherein the means for applying energy comprises a source of ions.

65. The device of claim 29, wherein the means for applying energy comprises a source of heat.

66. The device of claim 29, wherein the means for applying energy comprises a source of focused acoustic energy.

67. The device of claim 29, wherein the means for applying energy comprises means for applying an electrical current.

68. The device of claim 30, wherein the means for applying energy further comprises a source of heat.

69. The device of claim 30, wherein the means for applying energy further comprises a source of focused acoustic energy.

70. The device of claim 30, wherein the means for applying energy further comprises means for applying an electrical current.

* * * * *